(12) United States Patent
Falkowski et al.

(10) Patent No.: US 12,037,349 B2
(45) Date of Patent: **\*Jul. 16, 2024**

(54) METAL-ORGANIC FRAMEWORK MATERIALS COMPRISING A DIIMINE BIS-SALICYLATE SCAFFOLD AND METHODS FOR PRODUCTION THEREOF

(71) Applicant: ExxonMobil Technology and Engineering Company, Annandale, NJ (US)

(72) Inventors: Joseph M. Falkowski, Hampton, NJ (US); Mary S. Abdulkarim, Palisades Park, NJ (US); Carter W. Abney, Califon, NJ (US)

(73) Assignee: ExxonMobil Technology and Engineering Company, Annadale, NJ (US)

( * ) Notice: Subject to any disclaimer, the term of this patent is extended or adjusted under 35 U.S.C. 154(b) by 421 days.

This patent is subject to a terminal disclaimer.

(21) Appl. No.: 17/310,633

(22) PCT Filed: Mar. 30, 2020

(86) PCT No.: PCT/US2020/025656
§ 371 (c)(1),
(2) Date: Aug. 13, 2021

(87) PCT Pub. No.: WO2020/205702
PCT Pub. Date: Oct. 8, 2020

(65) Prior Publication Data
US 2022/0169663 A1 Jun. 2, 2022

Related U.S. Application Data

(60) Provisional application No. 62/964,251, filed on Jan. 22, 2020, provisional application No. 62/827,443, filed on Apr. 1, 2019.

(51) Int. Cl.
| | | |
|---|---|---|
| *C07F 3/06* | (2006.01) | |
| *C01B 37/00* | (2006.01) | |
| *C01B 39/00* | (2006.01) | |
| *C07F 3/00* | (2006.01) | |
| *C07F 3/02* | (2006.01) | |
| *C07F 15/04* | (2006.01) | |
| *C07F 15/06* | (2006.01) | |
| *C07F 19/00* | (2006.01) | |

(52) U.S. Cl.
CPC .............. *C07F 3/06* (2013.01); *C01B 37/00* (2013.01); *C01B 39/00* (2013.01); *C07F 3/003* (2013.01); *C07F 3/02* (2013.01); *C07F 15/045* (2013.01); *C07F 15/065* (2013.01); *C07F 19/005* (2013.01)

(58) Field of Classification Search
CPC ...... C07F 3/003; C07F 15/045; C07F 19/005; C07C 51/418; B01J 20/226
See application file for complete search history.

(56) References Cited

U.S. PATENT DOCUMENTS

| | | | |
|---|---|---|---|
| 2017/0073364 A1 | 3/2017 | Dinca et al. | |
| 2018/0250664 A1 | 9/2018 | Dinca et al. | |
| 2022/0153757 A1* | 5/2022 | Falkowski | ........... B01J 31/1815 |

FOREIGN PATENT DOCUMENTS

WO WO2020/205699 10/2020

OTHER PUBLICATIONS

B. Nguyen, et al., 28 Chemistry of Materials 6243-6249 (2016) ("Nguyen") (Year: 2016).*
Z. Herm, et al., 26 Chemistry of Materials 323-338. (2014) ("Herm") (Year: 2014).*
Z. Bao et al., 9 Energy and Environmental Science, 3612-3641 (2016) (Year: 2016).*
J. Liu et al., 46 Chem. Soc. Rev., 5730-5770 (2017) (Year: 2017).*
M. Ahamad et al., 49 Dalton Transactions, 14690-14705 (2020) (Year: 2020).*
Z. Yin et al., 378 Coordination Chemistry Reviews, 500-512 (2019) (Year: 2019).*
P. Li, et al., 5, Inorganic Chemistry Frontiers 2693-2708 (2018) ("Li") (Year: 2018).*
S. Yuan, et al., 4 ACS central science 440-450 (2018) ("Yuan") (Year: 2018).*
Petit, Camille, 20 Current opinion in chemical engineering 132-142 (2018) ("Petit") (Year: 2018).*
Li, et al. 1 EnergyChem 100006 (2019) ("Li") (Year: 2019).*
M. Murthy "New Members of the Periodic Table." 40-41 (2017) ("Murthy") (Year: 2017).*

* cited by examiner

*Primary Examiner* — Alexander R Pagano
*Assistant Examiner* — Frank S. Hou

(57) ABSTRACT

Metal-organic framework materials (MOFs) are highly porous entities comprising a multidentate organic ligand coordinated to multiple metal centers, typically as a coordination polymer. MOFs may comprise a plurality of metal centers, and a multidentate organic ligand coordinated via at least two binding sites to the plurality of metal centers to define an at least partially crystalline network structure having a plurality of internal pores, and in which the multidentate organic ligand comprises first and second binding sites bridged together with a third binding site comprising a diimine moiety. The multidentate organic ligand may comprise a reaction product of a vicinal dicarbonyl compound and an amine-substituted salicylic acid to define the first, second and third binding sites. Particular MOFs may comprise 5,59'-(((1E,2E)-ethane-1,2-diylidene)bis-(azaneylylidene))bis(2-hydroxybenzoic acid) as a multidentate organic ligand.

37 Claims, 7 Drawing Sheets

METAL-ORGANIC FRAMEWORK MATERIALS COMPRISING A DIIMINE BIS-SALICYLATE SCAFFOLD AND METHODS FOR PRODUCTION THEREOF

CROSS-REFERENCE TO RELATED APPLICATIONS

This application is a national stage application under 35 USC 371 of International Application No. PCT/US2020/025656 filed on Mar. 30, 2020, which claimed the benefit of U.S. Provisional Patent Application No. 62/964,251, filed Jan. 22, 2020 and U.S. Provisional Patent Application No. 62/827,443 filed Apr. 1, 2019.

FIELD

The present disclosure relates to metal-organic framework materials formed from multidentate organic ligands comprising a diimine moiety.

BACKGROUND

Metal-organic framework materials (MOFs) are a relatively new class of highly porous network materials having potential applications in a wide range of fields including gas storage, gas and liquid separations, isomer separation and resolution, waste treatment, and catalysis, among others. In contrast to zeolites, which are purely inorganic in character, MOFs comprise multidentate organic ligands that function as "struts" bridging metal atoms or clusters of metal atoms together in an extended coordination network structure (e.g., as a coordination polymer). Like zeolites, MOFs are microporous and exhibit a range of structures, including a tunable pore shape and/or size through selection of the multidentate organic ligand and metal source used in formation thereof.

Because organic ligands may be readily modified, MOFs exhibit a much greater breadth of structural diversity than is found for zeolites. Indeed, tens of thousands of MOF structures are now known, compared to only a few hundred unique zeolite structures. Factors that may influence the structure of MOFs include, for example, one or more of ligand denticity, size and type of the binding site(s) (coordinating group(s)) within the network structure, additional substitution remote or proximate to the binding site(s) within the network structure, ligand size and geometry, ligand hydrophobicity or hydrophilicity, ligand flexibility, choice of metal(s) and/or metal source(s) used during synthesis, choice of solvent(s), and reaction conditions such as temperature, concentration, and the like.

Although there is nearly unlimited structural diversity available for multidentate organic ligands, it is not a foregone conclusion that a given multidentate organic ligand will necessarily form a MOF when combined with a particular metal source. The multiple binding sites in multidentate organic ligands may either contribute to structure formation or be non-structural in nature. Structural binding sites include metal nodes within the network structure itself (i.e., within the backbone of the coordination polymer). Non-structural (secondary) binding sites may feature a coordinated metal present as a pendant group of the network structure. Optionally, at least a portion of the non-structural binding sites within a MOF may remain unoccupied after the network structure has formed. Multidentate organic ligands potentially capable of forming non-structural binding sites in a MOF may make crystallization of a network structure very difficult to realize. In particular, non-structural binding sites may interact with metal centers coordinated to a structural binding site, thereby interrupting nucleation and growth of the network structure needed to define a MOF. As a result, multidentate organic ligands employed for MOF syntheses are often designed with structural rigidity in mind to maintain the binding sites in a defined geometry to preclude unwanted cross-site interactions. Alternative approaches may include protecting the non-structural binding sites from participating in crystal growth, isolating hard and soft ligands at structural and non-structural binding sites, introducing non-structural binding sites through post-synthetic functionalization following MOF formation, or excluding non-structural binding sites altogether. Therefore, the range of accessible MOF network structures is more limited than might otherwise be synthesized. In addition, some multidentate organic ligands potentially suitable for forming MOFs, particularly those having non-structural binding sites, may be difficult and/or expensive to synthesize, thereby limiting practical access to MOFs potentially having designed structures for use in specific applications, such as catalysis and contaminant sequestration.

SUMMARY

In some embodiments, the present disclosure provides metal-organic framework materials comprising: a plurality of metal centers; and a multidentate organic ligand coordinated via at least two binding sites to the plurality of metal centers to define an at least partially crystalline network structure having a plurality of internal pores. The multidentate organic ligand comprises a reaction product of a vicinal dicarbonyl compound and an amine-substituted salicylic acid, the multidentate organic ligand comprising a first binding site and a second binding site that are bridged together with a third binding site, the first and second binding sites each comprising a salicylate moiety and the third binding site comprising a diimine moiety.

In some or other embodiments, the present disclosure provides methods for making metal-organic framework materials. The methods comprise: combining a metal source with a multidentate organic ligand comprising a reaction product of a vicinal dicarbonyl compound and an amine-substituted salicylic acid, the multidentate organic ligand comprising a first binding site and a second binding site that are bridged together with a third binding site, the first and second binding sites each comprising a salicylate moiety and the third binding site comprising a diimine moiety; and reacting the metal source with the multidentate organic ligand under conditions effective to form a metal-organic framework material having an at least partially crystalline network structure with a plurality of internal pores defined therein and comprising a plurality of metal centers. A metal center is coordinated to at least the first binding site and the second binding site, and the metal centers coordinated to the first binding site and the second binding site each comprise a first metal, or the metal center coordinated to the first binding site comprises the first metal and the metal center coordinated to the second binding site comprises a second metal.

In other embodiments, the present disclosure comprises methods for sequestering carbon dioxide. The methods comprise: providing a metal-organic framework material comprising a plurality of metal centers coordinated via at least two binding sites to 5,5'-(((1E,2E)-ethane-1,2-diylidene)bis(azaneylylidene))-bis(2-hydroxybenzoic acid) to define an at least partially crystalline network structure having a plurality of internal pores, at least a portion of the plurality of metal centers comprising a divalent metal; contacting the metal-organic framework material with a fluid comprising carbon dioxide; and sequestering at least a portion of the carbon dioxide from the fluid into the metal-organic framework material.

In still other embodiments, the present disclosure comprises methods for sequestering hydrocarbons. The methods comprise: providing a metal-organic framework material comprising a plurality of metal centers coordinated via at least two binding sites to 5,5'-(((1E,2E)-ethane-1,2-diylidene)bis(azaneylylidene))-bis(2-hydroxybenzoic acid) to define an at least partially crystalline network structure having a plurality of internal pores, at least a portion of the plurality of metal centers comprising a divalent metal; contacting the metal-organic framework material with a fluid comprising one or more hydrocarbons; and sequestering at least a portion of the one or more hydrocarbons from the fluid into the metal-organic framework material.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

Figure 1:
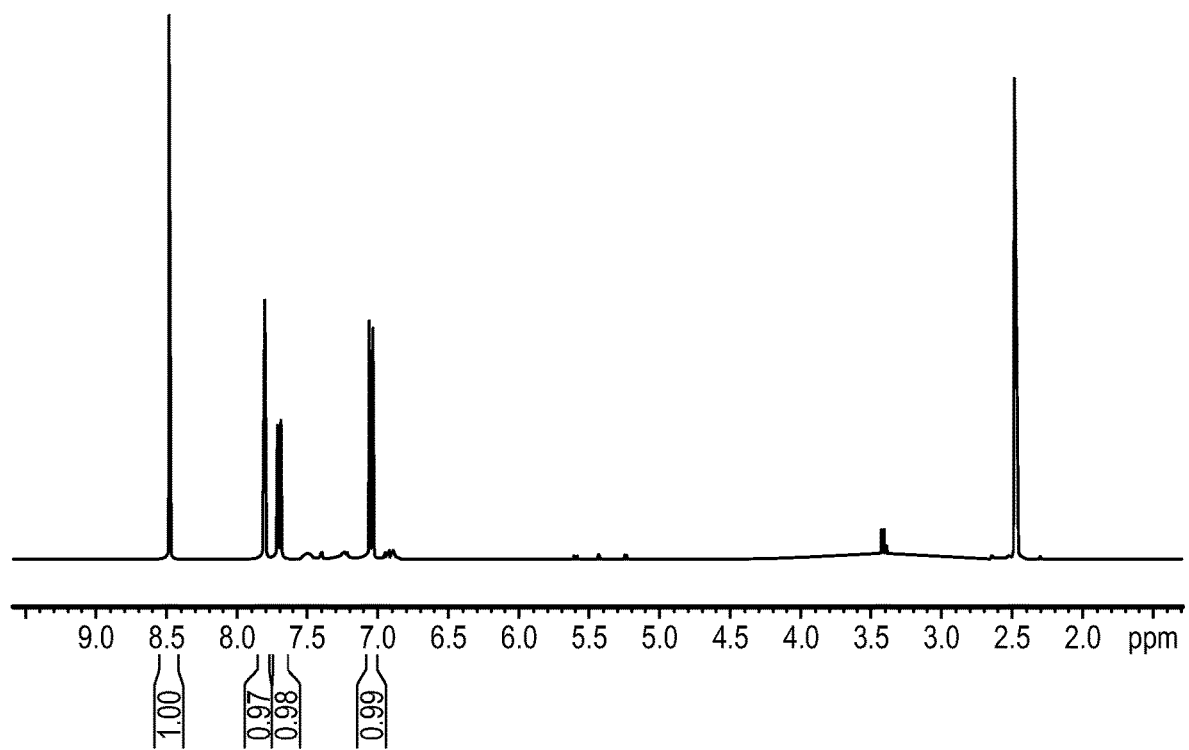
FIG. 1 shows an illustrative $^{1}$H NMR spectrum of 5,5'-(((1E,2E)-ethane-1,2-diylidene)bis-(azaneylylidene))bis(2-hydroxybenzoic acid).

The present disclosure generally relates to metal-organic framework materials and, more specifically, to metal-organic framework materials formed from multidentate organic ligands comprising a diimine moiety and multiple salicylate moieties and methods for production and use thereof.

As discussed in brief above, metal-organic framework materials (MOFs) may be synthesized by reacting a multidentate organic ligand with a suitable metal source to form a crystalline or partially crystalline network structure having a plurality of internal pores. The network structure may constitute a coordination polymer in some instances. Although a wide breadth of multidentate organic ligands may be produced synthetically, the syntheses may be difficult or expensive to perform in some cases, thereby limiting access to the corresponding metal-organic framework materials in practically useful quantities. Moreover, certain types of multidentate organic ligands do not afford ready formation of a crystalline network structure defining a metal-organic framework material when exposed to a metal source. Metal-organic framework materials may be particularly difficult to produce when using multidentate organic ligands containing orthogonal (different types of) donor atoms or groups that may be present as non-structural (secondary) binding sites in addition to those at structural (primary) binding sites. Namely, non-structural binding sites may interact with metal atoms coordinated at structural binding sites, which may hamper formation, growth, and/or crystallization of a metal-organic framework material.

The present disclosure provides multidentate organic ligands having orthogonal donor atoms that may react readily with an array of metal sources to afford at least partially crystalline metal-organic framework materials having a range of structural and morphological properties. The multidentate organic ligands feature two salicylate moieties that are linked by a diimine moiety. The salicylate moieties may react with a metal source to form structural binding sites, and the diimine moiety may be present as a non-structural binding site, which may be fully or partially occupied with a metal center, or unoccupied with a metal center. The metal center present at the non-structural binding sites (if any) may be introduced with the same metal source used to form the network structure, or a different metal source may be used to metallate the non-structural binding sites. Different metals may be present at the structural binding sites afforded by the first and second binding sites in some instances.

Advantageously, the multidentate organic ligands disclosed herein may be accessed readily through facile syntheses to afford orthogonal binding sites while still allowing MOF syntheses to take place. In particular, the multidentate ligands described herein may be formed by reacting an aminosalicylic acid compound with a vicinal dicarbonyl compound, such as glyoxal, an α-ketoaldehyde or a diketone. A wide range of structural diversity may be accommodated within the aminosalicylic acid or within the α-ketoaldehyde or diketone to introduce structural diversity at binding sites defined by the salicylate moieties and/or at binding sites defined by the diimine moieties. Further, advantageously, the non-structural binding sites may be filled or unfilled in the MOFs described herein, and a metal different than that present at the structural binding sites may be introduced in some instances, thereby affording ready access to mixed-metal MOFs having different metals at the structural (salicylate) binding sites and non-structural (diimine) binding sites. As such, a wide variety of MOFs having tailored properties and compositions may be realized through application of the disclosure herein.

The multidentate organic ligands disclosed herein may be readily synthesized by reacting a vicinal dicarbonyl compound with an organic synthon bearing an amine group, specifically an amine-substituted salicylic acid compound. The vicinal dicarbonyl compound reacts to form a diimine moiety bridging between two salicylate moieties. As discussed further herein, these multidentate organic ligands may react with various metal sources, particularly divalent metal sources, to form metal-organic framework materials having a breadth of structural and compositional diversity, including MOFs containing different metals at the structural and non-structural binding sites, and even different metals at the structural binding sites in some instances. This feature may allow MOFs to be readily synthesized with a first and/or second metal coordinated to the structural binding sites and yet a different metal coordinated to the non-structural binding sites. Such mixed-metal MOFs may be particularly desirable when the metal at the non-structural binding sites is expensive and/or does not lead to formation of an at least partially crystalline network structure when coordinated to the structural binding sites. For example, an inexpensive divalent metal, such as an alkaline earth metal like magnesium, may be used to promote formation of a MOF and a different metal, such as a metal capable of promoting catalysis or another type of reactive binding, for example, may be introduced at the non-structural binding sites in accordance with the disclosure herein. Metal exchange processes may also be used to displace a metal from at least a portion of the non-structural binding sites in the course of introducing a different metal thereto. Minimal structural reorganization occurs upon metallating the non-structural binding sites or exchanging metal at the non-structural binding sites in many cases.

Before describing the various embodiments of the present disclosure in further detail, a listing of terms follows to aid in better understanding the present disclosure.

All numerical values within the detailed description and the claims herein are modified by "about" or "approximately" with respect to the indicated value, and take into account experimental error and variations that would be expected by a person having ordinary skill in the art. Unless otherwise indicated, room temperature is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides).

The terms "hydrocarbyl" and "hydrocarbyl group" are used interchangeably herein. The term "hydrocarbyl group" refers to any $C_1$-$C_{100}$ hydrocarbon group bearing at least one unfilled valence position when removed from a parent compound. Suitable "hydrocarbyl" and "hydrocarbyl groups" may be optionally substituted. The term "hydrocarbyl group having 1 to about 100 carbon atoms" refers to an optionally substituted moiety selected from a linear or branched $C_1$-$C_{100}$ alkyl, a $C_3$-$C_{100}$ cycloalkyl, a $C_6$-$C_{100}$ aryl, a $C_2$-$C_{100}$ heteroaryl, a $C_1$-$C_{100}$ alkylaryl, a $C_7$-$C_{100}$ arylalkyl, and any combination thereof.

The term "substituted" refers to replacement of at least one hydrogen atom or carbon atom of a hydrocarbon or hydrocarbyl group with a heteroatom or heteroatom functional group. Heteroatoms may include, but are not limited to, B, O, N, S, P, F, Cl, Br, I, Si, Pb, Ge, Sn, As, Sb, Se, and Te. Heteroatom functional groups that may be present in substituted hydrocarbons or hydrocarbyl groups include, but are not limited to, functional groups such as O, S, S=O, $S(=O)_2$, $NO_2$, F, Cl, Br, I, $NR_2$, OR, SeR, TeR, $PR_2$, $AsR_2$, $SbR_2$, SR, $BR_2$, $SiR_3$, $GeR_3$, $SnR_3$, $PbR_3$, where R is a hydrocarbyl group or H. Suitable hydrocarbyl R groups may include alkyl, alkenyl, alkynyl, aryl, heteroaryl, cycloalkyl, heterocyclyl, and the like, any of which may be optionally substituted.

The terms "cyclic" or "cyclic hydrocarbon" refer to a hydrocarbon or hydrocarbyl group having a closed carbon ring, which may be optionally substituted.

As used herein, the term "multidentate" refers to a compound having two or more potential sites for coordinating a metal center. Accordingly, the term "multidentate" encompasses bidentate, tridentate, tetradentate, and higher denticity ligands.

The term "metal center" refers to a single metal atom or metal ion, or a group (cluster) of metal atoms or metal ions to which a ligand is coordinatively bonded at a given binding site.

The term "diimine" refers to a chemical entity bearing a two carbon atoms that are singly bonded together, and each carbon atom is doubly bonded to a nitrogen atom. The two carbon atoms may be independently substituted with H and/or a hydrocarbyl group, wherein the substitution upon each carbon atom may be the same or different.

The term "at least partially crystalline" means that a substance exhibits an X-ray powder diffraction pattern.

The term "binding site" refers to a chemical entity capable of coordinating a metal or metal cluster by a metal-ligand bond.

Accordingly, metal-organic framework materials of the present disclosure may comprise: a plurality of metal centers and a multidentate organic ligand coordinated via at least two binding sites to the plurality of metal centers to define an at least partially crystalline network structure having a plurality of internal pores. The multidentate organic ligand comprises a reaction product of a vicinal dicarbonyl compound and an amine-substituted salicylic acid. The multidentate organic ligand comprises a first binding site and a second binding site that are bridged together with a third binding site. The first and second binding sites each comprise a salicylate moiety and the third binding site comprises a diimine moiety.

Determination of the presence of a network structure and crystallinity thereof, including a determination of whether a particular network structure is related to or isostructural with another network structure, may be performed by X-ray powder diffraction, as described further herein.

Suitable amine-substituted salicylic acids include a 1,2-arrangement of a hydroxyl group and a carboxylic acid group upon an phenyl ring, with an amine group being present at any open ring position. Thus, suitable amine-substituted salicylic acids may feature the amine group in any of the 3, 4, 5 or 6 positions of the phenyl ring, based on an IUPAC numbering convention in which the carboxylic acid group is assigned position 1 upon the phenyl ring. In addition to the amine group, additional hydrocarbyl or heteroatom substitution may be present upon the phenyl ring of the amine-substituted salicylic acid.

Multidentate organic ligands of the present disclosure may be synthesized by reacting a vicinal dicarbonyl compound with a suitable amine-substituted salicylic acid. The vicinal dicarbonyl compound may be glyoxal, a α-diketone or an α-ketoaldehyde. Depending on the dicarbonyl compound used, the multidentate organic ligand may bear one or more hydrocarbyl substitutions upon the diimine moiety defining the third binding site. When glyoxal is used to form the multidentate organic ligands, for example, the diimine moiety is substituted with two hydrogen moieties, whereas vicinal diketones or vicinal ketoaldehydes lead to substitution with two or one hydrocarbyl groups, respectively. In particular implementations of the present disclosure, a suitable multidentate organic ligand may be synthesized by reacting 1,2-ethanedicarboxaldehyde (glyoxal) with 5-aminosalicylic acid to form 5,5'-(((1E,2E)-ethane-1,2-diylidene)bis(azaneylylidene))bis(2-hydroxybenzoic acid).

Suitable multidentate organic ligands for forming metal-organic framework materials according to the present disclosure may have a structure represented by Formula 1 below.

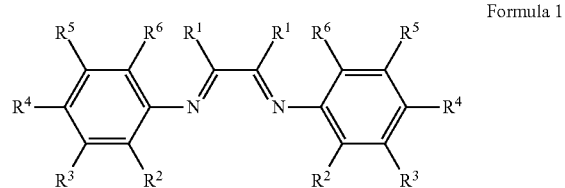

Formula 1

Referring to Formula 1, each $R^1$ is H or an optionally substituted hydrocarbyl group, wherein each occurrence of $R^1$ may be the same or different. Suitable hydrocarbyl groups that may be selected for $R^1$ include $C_1$-$C_{30}$ alkyl groups, $C_2$-$C_{30}$ alkenyl or alkynyl groups, $C_3$-$C_{30}$ cycloalkyl groups, $C_4$-$C_{10}$ aromatic or heteroaromatic groups, or the like, any of which may be optionally substituted. Optionally, each $R^1$ may be joined together in Formula 1 to define a diimine having a cyclic structure. One occurrence of $R^1$ may be H and one occurrence of $R^1$ may be an optionally substituted hydrocarbyl group when the dicarbonyl compound is a vicinal ketoaldehyde. Both occurrences of $R^1$ are an optionally substituted hydrocarbyl group when the dicarbonyl compound is a vicinal diketone, wherein the occurrences of $R^1$ may be the same for a symmetrical diketone or different for an unsymmetrical diketone. $R^2$ and $R^3$, $R^3$ and $R^4$, $R^4$ and $R^5$, or $R^5$ and $R^6$ may comprise one carboxylic acid group and one hydroxyl group, and any of $R^2$-$R^6$ that are not a carboxylic acid group or a hydroxyl group may be hydrogen, a hydrocarbyl group, or a heteroatom functional group. Particular examples of multidentate organic ligands that may be suitable for use in the disclosure herein may have structures represented by Formulas 2A-2D below.

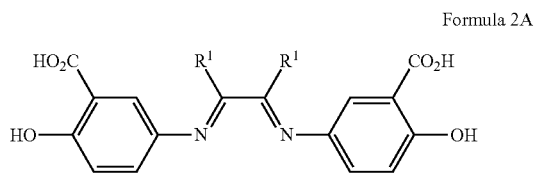

Formula 2A

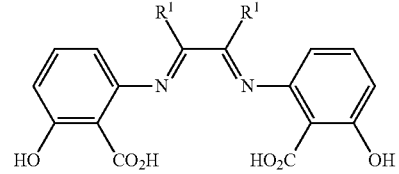

Formula 2B

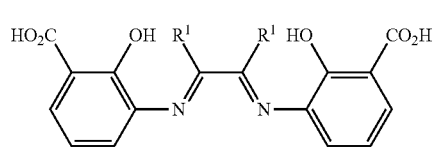

Formula 2C

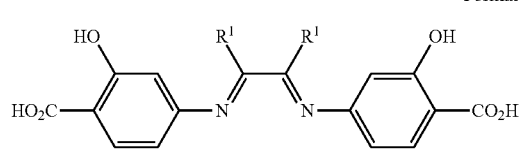

Formula 2D

In more particular examples, suitable multidentate organic ligands may have a structure represented by Formula 2A, in which each occurrence of $R^1$, $R^2$, $R^3$ and $R^6$ is H, each occurrence of $R^4$ is OH, and each occurrence of $R^5$ is a carboxylic acid ($CO_2H$).

The metal-organic framework materials of the present disclosure comprise a multidentate organic ligand, as discussed above, coordinated to the plurality of metal centers via at least the salicylate moieties of the multidentate organic ligand, thereby defining a first binding site and a second binding site for metal coordination within the at least partially crystalline network structure. The metal centers coordinated to the first binding site and the second binding site may comprise structural nodes at structural binding sites of the at least partially crystalline network structure. The metal centers at the first and second binding sites may be the same metal or different metals, such as the same or different divalent metals. In general, the metal centers at the structural nodes are not configured to undergo exchange with other metals following formation of the at least partially crystalline network structure. The diimine moiety also defines a third binding site, which may or may not be coordinated to a metal center in the metal-organic framework materials disclosed herein. The third binding site within the at least partially crystalline network structure may be unfilled, filled, or partially filled with a metal center, which may be the same as or different than a metal center located at the structural nodes. In addition, a metal center coordinated to the diimine moiety may undergo exchange to introduce a different metal to the third binding site than was initially present. Alternately, an unfilled third binding site may be filled upon contacting the at least partially crystalline network structure with an appropriate metal source, such as a solution of a metal salt, wherein the metal center coordinated to the third binding site may again be the same as or differ from the metal centers coordinated to the first and second binding sites, wherein the metal centers at the first and second binding sites may also be the same or different types of metal centers.

The identity of the metal centers that may be coordinated to the salicylate moieties in the metal-organic framework materials disclosed herein is not considered to be particularly limited, as salicylate moieties are able to bind a wide range of metals in several oxidation states. Divalent metals may be particularly desirable for coordination with the salicylate moieties, given the high affinity of divalent metals for salicylate ligands. Trivalent metals may also be suitably included, either alone or in combination with one or more divalent metals. Suitable divalent metals that may be present in the metal-organic framework materials disclosed herein include, for example, an alkaline earth metal (e.g., magnesium, calcium, or any combination thereof, as non-limiting examples), and/or a divalent transition metal (e.g., zinc, cobalt, nickel, copper, manganese, iron, or any combination thereof, as non-limiting examples). The metal(s) located in the plurality of metal centers may be introduced when reacting a suitable metal source with the multidentate ligand disclosed above or through exchanging a portion of the metal(s) in the metal centers after forming the at least partially crystalline network structure, particularly during exchange or introduction of the metals coordinated to the third binding site. The metal centers may be present in any form including, but not limited to, discrete metal cations, metal clusters, metal chains, or any combination thereof.

Suitable metal salts that may be used to form metal-organic framework materials via binding to the salicylate moieties according to the disclosure herein include metal ions such as, but not limited to, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{2+}$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Cd^{2+}$, $Hg^{2+}$, $Al^{3+}$, $Ga^{3+}$, $In^{3+}$, $Ti^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$ and $Bi^+$. Other oxidation states of these metal ions may also be suitable in some instances. Depending on the identity of the multidentate organic ligand and the conditions under which the metal-organic framework material is formed, suitable counterion forms for the metal ions may include, but are not limited to, nitrate, nitrite, sulfate, hydrogen sulfate, oxide, acetate, formate, oxide, hydroxide, benzoate, alkoxide, carbonate, acetylacetonoate, hydrogen carbonate, fluoride, chloride, bromide, iodide, phosphate, hydrogen phosphate, dihydrogen phosphate, or the like.

The third binding site, a diimine moiety, may also be bound to a metal, particularly a divalent metal, which may be the same as or different from the metal(s) bound to the salicylate moieties at the structural nodes of the at least partially crystalline network structure. None, a portion of, or all of the diimine moieties in the metal-organic framework material may be bound to a metal. The metal coordinated to the third binding site may be introduced when reacting a suitable metal source with the multidentate organic ligand to form the at least partially crystalline network structure or by contacting a suitable metal source with the at least partially crystalline network structure after formation thereof. Contacting a metal source with the at least partially crystalline network structure may comprise coordinating a metal to an unfilled diimine binding site and/or exchanging a different metal for a metal already coordinated at a diimine binding site. In non-limiting examples, divalent transition metals may be introduced into the third binding site defined by the diimine moiety while reacting a source of divalent metal with the first and second binding sites defined by the salicylate moieties to form the at least partially crystalline network structure. In this case, the metal coordinated to the third binding site may be the same as the metal(s) coordinated to the first and second binding sites, although the metal at the third binding site may be subsequently exchanged. In another non-limiting example, an alkaline earth metal may be coordinated to the salicylate moieties at the first and second binding sites, thereby leaving at least a portion of the diimine moieties unbonded due to the low affinity of alkaline earth metals for diimine ligands. After forming the at least partially crystalline network structure with an alkaline earth metal or a divalent transition metal that does not coordinate well to the diimine moieties, a different metal may be contacted with the metal-organic framework material to coordinate a different metal to at least a portion of the diimine moieties at the third binding site. In various embodiments, the metal being coordinated to the diimine moieties may be a catalytic metal, such as, but not limited to, cobalt, nickel, copper, iron, or a precious metal such as palladium, platinum, gold, silver, iridium, osmium, ruthenium, rhodium, or any combination thereof. Suitable metal sources for introducing a metal to the diimine moieties may include, but are not limited to, those listed above as being suitable for forming the at least partially crystalline network structure.

The molar ratio of metal to ligand in the metal-organic framework materials of the present disclosure may vary depending on the metal, but may range from two moles of metal atoms per mole of multidentate organic ligand in cases where all of the diimine moieties are vacant up to three moles of metal atoms per mole of multidentate organic ligand where all of the diimine moieties are coordinated to a metal.

The metal-organic framework materials disclosed herein may be characterized in terms of their X-ray powder diffraction patterns. In addition, the metal-organic framework materials formed according to the disclosure herein may be characterized in terms of their internal porosity. The metal-organic framework materials of the present disclosure may include micropores, mesopores, macropores and any combination thereof. Micropores are defined herein as having a pore size of about 2 nm or below, and mesopores are defined herein as having a pore size from about 2 nm to about 50 nm. Determination of microporosity and/or mesoporosity may be determined by analysis of the nitrogen adsorption isotherms at 77 K, as will be understood by one having ordinary skill in the art. Internal pore volumes and other morphological features of the metal-organic framework materials may similarly be determined from the nitrogen adsorption isotherms, as also will be understood by one having ordinary skill in the art. Surface areas up to about 3000 $m^2/g$ may be obtained according to the disclosure herein, with the activation conditions determining the surface area obtained. Pore volumes may range from about 0.09 mL/g to about 2.1 mL/g, which may afford multi-layer nitrogen adsorption in some instances.

Methods are also described herein for synthesizing the metal-organic framework materials of the present disclosure. Such synthetic methods of the present disclosure may comprise combining a metal source with a multidentate organic ligand, the multidentate organic ligand comprising a reaction product of a vicinal dicarbonyl compound and an amine-substituted salicylic acid, such that the multidentate organic ligand comprises a first binding site and a second binding site, each binding site comprising a salicylate moiety, that are bridged together with a third binding site comprising a diimine moiety. The multidentate organic ligand and the metal source may be reacted under conditions effective to form a metal-organic framework material having an at least partially crystalline network structure with a plurality of internal pores defined therein and comprising a plurality of metal centers, in which a metal center is coordinated to at least the first binding site and the second binding site. Any of the multidentate organic ligands specified by Formulas 1, 2A, 2B, 2C or 2D above may be utilized to synthesize metal-organic framework materials by the methods disclosed herein. Examples of suitable metal sources include any of the metal salts disclosed above, particularly divalent metal salts. The first and second binding sites may each comprise a first metal, or the metal center coordinated to a first binding site may comprise the first metal, and the metal center coordinated to a second binding site may comprise a second metal, which may be the same as or different than the first metal.

Even more specifically, methods of the present disclosure may comprise combining a metal source with 5,5'-(((1E, 2E)-ethane-1,2-diylidene)bis(azaneylylidene))bis(2-hydroxybenzoic acid) and reacting the metal source with the 5,5'-(((1E,2E)-ethane-1,2-diylidene)bis(azaneylylidene))bis (2-hydroxybenzoic acid) to form a metal-organic framework material having an at least partially crystalline network structure with a plurality of internal pores defined therein and comprising a plurality of metal centers coordinated thereto.

Methods of the present disclosure may further comprise introducing a metal to the at least partially crystalline network structure at the third binding site, wherein the metal coordinated to the third binding site differs from a first metal bound and/or second metal coordinated to the first binding site and the second site. Introducing the metal at the third binding site may comprise filling an empty third binding site within the at least partially crystalline network structure. Some or other methods of the present disclosure may comprise exchanging at least a portion of the plurality of metal centers in an as-synthesized metal organic framework material of the present disclosure. For example, a portion of the metals coordinated to the diimine moiety at the third binding site may be exchanged for a second metal, such as one or more of cobalt, nickel, copper, iron, or a precious metal such as palladium, platinum, gold, silver, iridium, osmium, ruthenium, rhodium, or any combination thereof. Metal exchange may be affected by contacting the metal-organic framework material with a metal salt solution, for example.

Certain metal-organic framework materials of the present disclosure may have catalytic properties, either by themselves or after activation in the presence of a suitable activator. One particular example of a catalytic metal-organic framework material may comprise a catalytically active metal bound to at least a portion of the diimine moieties in the at least partially crystalline network structure, such as, but not limited to, cobalt, nickel, copper, iron, or a precious metal such as palladium, platinum, gold, silver, iridium, osmium, ruthenium, rhodium, or any combination thereof. The catalytically active metal may be introduced during synthesis of the metal-organic framework material or after formation through metal exchange and/or filling an unoccupied binding site comprising a diimine moiety.

Metal-organic framework materials of the present disclosure may have properties suitable for adsorbing carbon dioxide into the at least partially crystalline network structure. Accordingly, the present disclosure also provides methods for capturing or sequestering carbon dioxide ($CO_2$) which comprise: contacting a $CO_2$-containing fluid with a metal-organic framework material having an at least partially crystalline network structure with a plurality of internal pores defined therein and comprising a plurality of metal centers coordinated via at least two binding sites to a multidentate organic ligand that is a reaction product of a vicinal dicarbonyl compound and an amine-substituted salicylic acid, under conditions effective to sequester at least a portion of the carbon dioxide from the fluid within the at least partially crystalline network structure. The methods may further comprise removing the metal-organic framework material from the fluid after sequestering the carbon dioxide therein, thereby decreasing the concentration of carbon dioxide contained within the fluid."

As used in this disclosure, the term "fluid" refers to gases, liquids or any combination thereof. A fluid comprising carbon dioxide may also comprise other gasses including, but not limited to nitrogen, oxygen, argon, helium, water vapor, hydrogen, carbon monoxide, methane, ethane, hydrogen sulfide, nitrogen oxides (e.g., nitric oxide, nitrous oxide, nitrogen dioxide), sulfur dioxide or the like.

In some embodiments, the $CO_2$-containing fluid may be contacted with the metal-organic framework material at a temperature of about −20° C. to about 100° C., or about −10° C. to about 80° C., or about 0° C. to about 60° C., or about 10° C. to about 40° C., or about 20° C. to about 30° C., or about 25° C. In addition, the $CO_2$-containing fluid may be contacted with the metal-organic framework material at a pressure of about 0.5 bar (50 KPa) to about 10 bar (100 KPa), or about 0.6 bar (60 KPa) to about 8 bar (800 KPa), or about 0.7 bar (70 KPa) to about 6 bar (600 KPa), or about 0.8 bar (80 KPa) to about 4 bar (400 KPa), or about 0.9 bar (90 KPa) to about 2 bar (200 KPa), or about 1 bar (100 KPa).

The $CO_2$-containing fluid may be recovered (or may be directly supplied) from an upstream processing unit (e.g., a methanol producing unit, a steam power plant, a steam generator, a combustor, an oxy-fuel combustor, an ion transport membrane, and the like). In circumstances where the temperature and/or the pressure of the $CO_2$-containing fluid falls outside of the above mentioned operating temperature and pressure ranges, the temperature and the pressure of the $CO_2$-containing fluid may be adjusted to be within said operating temperature and pressure ranges prior to contacting the $CO_2$-containing fluid with the metal-organic framework material.

A $CO_2$-depleted fluid may be obtained after at least partially sequestration of the carbon dioxide within a $CO_2$-containing fluid. The composition of the $CO_2$-depleted fluid may vary depending on the composition of the $CO_2$-containing fluid and the nature of the metal-organic framework material contacted therewith. In some embodiments, the $CO_2$-depleted fluid may include a decreased amount of carbon dioxide relative to the $CO_2$-containing fluid and also comprise one or more gaseous substances including, but not limited to nitrogen, oxygen, argon, helium, water vapor, hydrogen, carbon monoxide, methane, ethane, hydrogen sulfide, nitrogen oxides (e.g., nitric oxide, nitrous oxide, nitrogen dioxide), or sulfur dioxide. A volumetric ratio of carbon dioxide to the one or more gaseous substances in the $CO_2$-depleted fluid may vary in the range of 1:100 to 1:1. In another embodiment, the $CO_2$-depleted fluid may not include carbon dioxide. In still another embodiment, the $CO_2$-depleted fluid may be substantially free of carbon dioxide, which may include a $CO_2$ content of less than about 100 ppm, less than about 10 ppm, less than about 1 ppm, or less than about 1 ppb carbon dioxide.

The $CO_2$-containing fluid may be contacted with the metal-organic framework material by flowing the $CO_2$-containing fluid over or through the metal-organic framework material (e.g., within a fixed bed column or cartridge). Alternatively, the $CO_2$-containing fluid may stay stagnant over the metal-organic framework material.

After sequestering the carbon dioxide, the carbon dioxide may be at least partially desorbed from the metal-organic framework material. Desorption may be accomplished, for example, by heating the metal-organic framework material to a temperature of about 50° C. to about 250° C., or about 50° C. to about 250° C., or about 80° C. to about 200° C., or about 100° C. to 150° C., wherein the desorbed carbon dioxide may be collected as a $CO_2$ stream. Alternatively, the carbon dioxide may be at least partially desorbed by lowering the pressure of the atmosphere surrounding the metal-organic framework material, such as within a range of about 0.05 bars (5 KPa) to about 0.9 bar (90 KPa) or about 0.1 bars (10 KPa) to 0.5 bars (50 KPa). In yet another alternative, the carbon dioxide may be at least partially desorbed by flowing a flushing gas over or through the metal-organic framework material to exchange at least a portion of the carbon dioxide within the metal-organic framework material with molecules of the flushing gas.

The $CO_2$ stream may include carbon dioxide and may further comprise one or more gaseous substances, including but not limited to, nitrogen, oxygen, argon, helium, water vapor, hydrogen, carbon monoxide, methane, ethane, hydrogen sulfide, nitrogen oxides (e.g., nitric oxide, nitrous oxide, nitrogen dioxide), or sulfur dioxide. The $CO_2$ stream may further be injected into a geological formation, or the $CO_2$ stream may be captured by other means known to those skilled in the art. The $CO_2$ stream may also be utilized in supercritical extraction systems. Alternatively, the $CO_2$ stream may be utilized to dilute gaseous streams, or may be utilized in processes where a low/medium/high pressure $CO_2$ stream is required. For example, in one embodiment, the $CO_2$ stream may be mixed with a fuel or an oxygen stream before feeding into a combustor. In an alternative embodiment, the $CO_2$ stream may be mixed with an enriched-oxygen stream prior to delivering to an ion transport membrane.

When used for carbon dioxide sequestration, the metal-organic framework materials may include an adsorbent matrix, such as one or more of a basic metal carbonate and a metal oxide and may optionally further include other adsorbent materials, such as but not limited to, zeolites, carbon nanotubes, graphene, graphite flakes, desiccants, and the like. Further, the metal-organic framework materials may be present in combination with a polymeric binder as well.

In addition to carbon dioxide sequestration, the metal-organic framework materials disclosed herein may be useful in other types of adsorptive separations. In non-limiting examples, hydrocarbons, particularly hydrocarbon streams comprising at least one hydrocarbon and more particularly comprising at least one olefin, may be separated using the metal-organic framework materials disclosed herein. Olefin binding may occur to the structural binding sites. In particular, the one or more hydrocarbons may comprise two or more different hydrocarbons, and a first hydrocarbon may be preferentially sequestered into the metal-organic framework material over a second hydrocarbon. For example, an alkylene, such as ethylene, may be preferentially sequestered over and alkane, such as ethane.

Embodiments disclosed herein include:

A. Metal-organic framework materials. The metal-organic framework materials comprise: a plurality of metal centers; and a multidentate organic ligand coordinated via at least two binding sites to the plurality of metal centers to define an at least partially crystalline network structure having a plurality of internal pores; wherein the multidentate organic ligand comprises a reaction product of a vicinal dicarbonyl compound and an amine-substituted salicylic acid, the multidentate organic ligand comprising a first binding site and a second binding site that are bridged together with a third binding site, the first and second binding sites each comprising a salicylate moiety and the third binding site comprising a diimine moiety.

B. Methods for making a metal-organic framework material. The methods comprise: combining a metal source with a multidentate organic ligand comprising a reaction product of a vicinal dicarbonyl compound and an amine-substituted salicylic acid, the multidentate organic ligand comprising a first binding site and a second binding site that are bridged together with a third binding site, the first and second binding sites each comprising a salicylate moiety and the third binding site comprising a diimine moiety; and reacting the metal source with the multidentate organic ligand under conditions effective to form a metal-organic framework material having an at least partially crystalline network structure with a plurality of internal pores defined therein and comprising a plurality of metal centers, a metal center being coordinated to at least the first binding site and the second binding site, the metal centers coordinated to the first binding site and the second binding site each comprising a first metal, or the metal center coordinated to the first binding site comprising the first metal and the metal center coordinated to the second binding site comprising a second metal.

C. Carbon sequestration methods using a metal-organic framework material. The methods comprise: providing a metal-organic framework material comprising a plurality of metal centers coordinated via at least two binding sites to 5,5'-(((1E,2E)-ethane-1,2-diylidene)bis(azaneylylidene))-bis(2-hydroxybenzoic acid) to define an at least partially crystalline network structure having a plurality of internal pores, at least a portion of the plurality of metal centers comprising a divalent metal; contacting the metal-organic framework material with a fluid comprising carbon dioxide; and sequestering at least a portion of the carbon dioxide from the fluid into the metal-organic framework material.

D. Hydrocarbon sequestration methods using a metal-organic framework material. The methods comprise: providing a metal-organic framework material comprising a plurality of metal centers coordinated via at least two binding sites to 5,5'-(((1E,2E)-ethane-1,2-diylidene)bis(azaneylylidene))-bis(2-hydroxybenzoic acid) to define an at least partially crystalline network structure having a plurality of internal pores, at least a portion of the plurality of metal centers comprising a divalent metal; contacting the metal-organic framework material with a fluid comprising one or more hydrocarbons; and sequestering at least a portion of the one or more hydrocarbons from the fluid into the metal-organic framework material.

Embodiments A-D may have one or more of the following elements in any combination:

Element 1: wherein the amine-substituted salicylic acid is 5-aminosalicylic acid.

Element 2: wherein the vicinal dicarbonyl compound is glyoxal.

Element 3: wherein the multidentate organic ligand is 5,5'-(((1E,2E)-ethane-1,2-diylidene)bis-(azaneylylidene)) bis(2-hydroxybenzoic acid).

Element 4: wherein at least a portion of the plurality of metal centers comprise a divalent metal.

Element 5: wherein the first binding site is coordinated to a first divalent metal center and the second binding site is coordinated to a second divalent metal center, the first divalent metal center and the second divalent metal center comprising the same divalent metal.

Element 6: wherein the divalent metal is an alkaline earth metal.

Element 7: wherein the divalent metal is magnesium.

Element 8: wherein at least the first binding site and the second binding site are coordinated to a metal center to define the at least partially crystalline network structure.

Element 9: wherein the first binding site and the second binding site are coordinated to at least one type of metal center and the third binding site is coordinated to a second type of metal center.

Element 10: wherein the at least one type of metal center comprises a divalent metal.

Element 11: wherein the second type of metal center comprises a divalent metal differing from the at least one type of metal center coordinated to the first binding site and the second binding site.

Element 12: wherein the first binding site is coordinated to a first type of metal center and the second binding site is coordinated to a second type of metal center, the first type of metal center and the second type of metal center being the same.

Element 13: wherein the first binding site is coordinated to a first type of metal center and the second binding site is coordinated to a second type of metal center, the first type of metal center and the second type of metal center being different.

Element 14: wherein the metal-organic framework material lacks a metal center at the third binding site or is incompletely occupied with a metal center at the third binding site.

Element 15: wherein the metal-organic framework material comprises a metal center at the third binding site.

Element 16: wherein the first type of metal center and the second type of metal center comprise a divalent metal.

Element 17: wherein the first binding site, the second binding site, and the third binding site are coordinated to the same type of metal center.

Element 18: wherein the metal-organic framework material lacks a metal center at the third binding site or is incompletely occupied with a metal center at the third binding site.

Element 19: wherein at least a portion of the plurality of metal centers comprises magnesium, manganese, chromium, iron, copper, cobalt, nickel, or any combination thereof.

Element 20: wherein the first binding site is coordinated to a first divalent metal center and the second binding site is coordinated to a second divalent metal center, the first divalent metal center and the second divalent metal center comprising different divalent metals.

Element 21: wherein the metal-organic framework material lacks a metal center at the third binding site or is incompletely occupied with a metal center at the third binding site.

Element 22: wherein the method further comprises: introducing a metal center to the at least partially crystalline network structure at the third binding site, the metal center at the third binding site differing from the first metal coordinated at the first binding site and the second binding site, or the metal center at the third binding site differing from the first metal coordinated at the first binding site and the second metal coordinated at the second binding site.

Element 23: wherein introducing the metal center to the at least partially crystalline network structure at the third binding site comprises exchanging first metal or second metal coordinated at the third binding site for a different metal.

Element 24: wherein introducing the metal center to the at least partially crystalline network structure at the third binding site comprises filling an empty third binding site with a different metal.

Element 25: wherein the metal source comprises one or more of manganese, chromium, iron, copper, cobalt, nickel, palladium, platinum, gold, silver, iridium, osmium, ruthenium, and rhodium.

Element 26: wherein the divalent metal is one or more of magnesium, manganese, chromium, iron, copper, cobalt, and nickel.

Element 27: wherein the one or more hydrocarbons comprise two or more different hydrocarbons, and a first hydrocarbon is preferentially sequestered into the metal-organic framework material over a second hydrocarbon.

By way of non-limiting example, exemplary combinations applicable to A include, but are not limited to, 1 and 2; 3 and 4; 3 and 5; 3-5; 3, 4 and 6; 3, 4 and 7; 3 and 8; 3, 4 and 8; 3, 4, 6 and 8; 3 and 9; 3, 9 and 10; 3, 9 and 11; 3, 9, 10 and 12; 3 and 12; 3 and 13; 3 and 14; 3 and 15; 3 and 16; 3 and 17; 3 and 18; 3 and 19; 4 and 5; 4 and 6; 4, 6 and 7; 8 and 9, 8 and 10; 8-10; 8 and 12; 8 and 13; 8 and 14; 8 and 15; 8 and 16; 8 and 17; 8 and 19; 9 and 10; 9 and 11; 9 and 12; 9 and 13; 11 and 12; 11 and 13; 11 and 14; 11 and 15; 11 and 16; 17 and 19; and 18 and 19. Exemplary combinations applicable B include, but are not limited to, 3 and 4; 3 and 5; 3 and 6; 3 and 7; 3 and 20; 3 and 21; 3 and 22; 3, 22 and 23; 3, 22 and 24; 3 and 25; 4 and 5; 4 and 6; 4 and 7; 4 and 20; 4 and 21; 2 and 22; 4, 22 and 23; 4, 22 and 24; 4 and 25; 5 and 6; 5-7; 5 and 20; 5 and 21; 5 and 22; 5, 22 and 23; 5, 22 and 24; 5 and 25; 21 and 22; 21-23; 22 and 23; 22 and 24; and 22 and 25. Exemplary combinations applicable to C and D include, but are not limited to, 4 and 5; 4 and 6; 4 and 7; 4 and 8; 4 and 9; 4 and 12; 4 and 13; 4 and 14; 4 and 15; 4 and 17; 4 and 18; 5 and 6; 5 and 7; 5 and 12; 5 and 13; 5 and 14; 5 and 15; 8 and 9; 8-10; 8 and 11; 8 and 12; 8 and 13; 8 and 14; 8 and 16; 8 and 17; 8 and 18; 9 and 11; 9 and 12; and 9 and 13, any of which may be in further combination with 26 for C and D or in further combination with 27 for D.

To facilitate a better understanding of the present disclosure, the following examples of preferred or representative embodiments are given. In no way should the following examples be read to limit, or to define, the scope of the present disclosure.

EXAMPLES

X-ray powder diffraction patterns in the examples below were obtained using Cu K-α radiation. BET surface areas in the examples below were determined from $N_2$ adsorption isotherms obtained at 77 K. The $N_2$ adsorption isotherms were measured using an Autosorb IQ3 analyzer (Quantachrom) at 77 K. Before measurement, the samples were degassed at 150° C. to a constant pressure of $10^{-5}$ torr for 4 hours. The surface area was then measured by the amount of $N_2$ adsorbed onto the surface of the sample. Regression analysis was subsequently applied to the data, resulting in an isotherm. The isotherms were further analyzed to calculate the micropore volume and other quantities.

Figure 2:
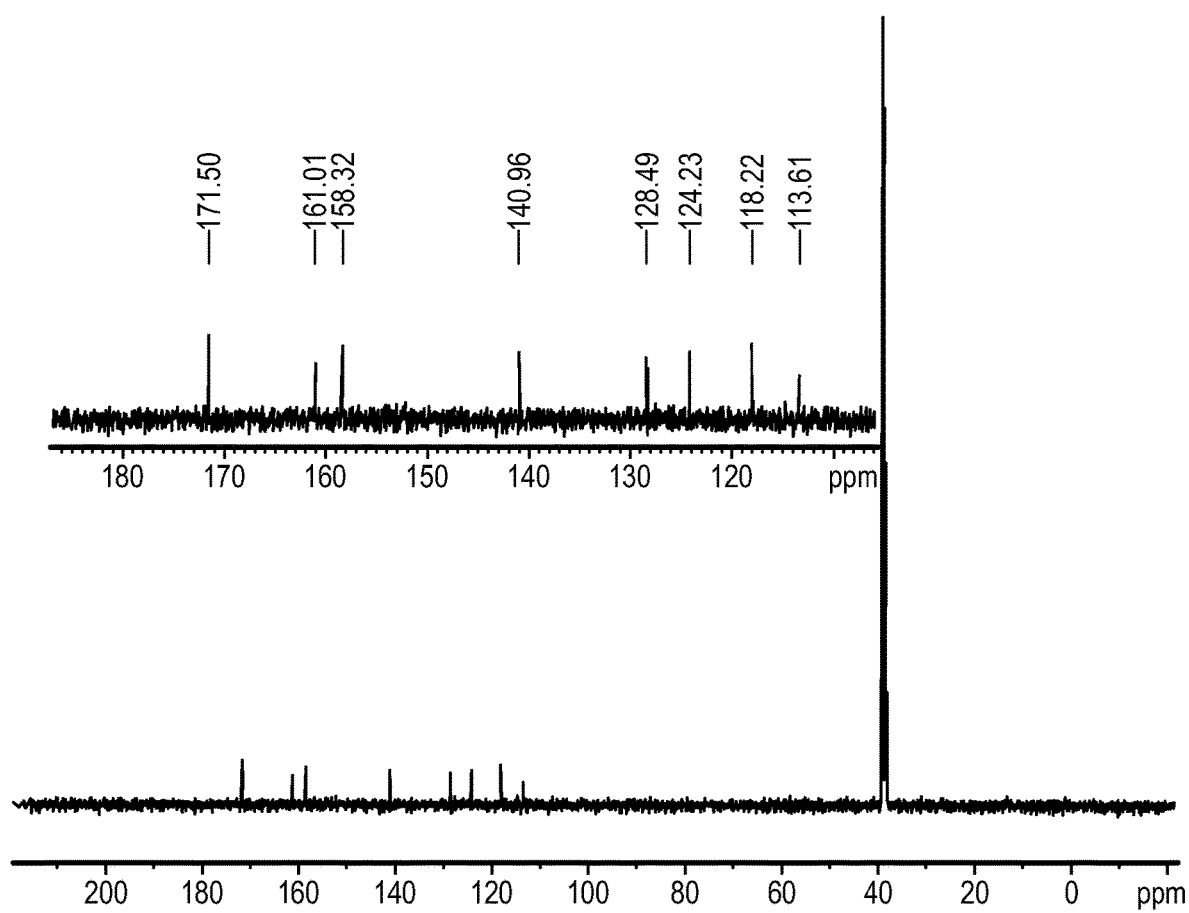
FIG. 2 shows an illustrative $^{13}$C NMR spectrum of 5,5'-(((1E,2E)-ethane-1,2-diylidene)bis-(azaneylylidene))bis(2-hydroxybenzoic acid).

Example 1: Ligand Synthesis. 75 grams of 4-aminosalicylic acid, 15 mL of formic acid, and 53.2 grams of glyoxal (40 wt. % solution) were added to 1400 mL of heated ethanol (50° C.). The reaction mixture was heated at 50° C. overnight, during which an orange color began to form within about an hour after combining. The reaction mixture was filtered to isolate a solid, which was washed with ethanol until the filtrate became clear. The solid was then washed additionally with 200 mL of 1 M HCl, suspended in 600 mL of 1 M HCl, and stirred for 3 hours. The suspension was filtered, and the filter cake was subsequently washed with ethanol until the filtrate became colored and then turned clear again. The solid was then dried in an oven at 115° C. under air for several hours to yield an orange solid, which was identified as 5,5'-(((1E,2E)-ethane-1,2-diylidene)bis-(azaneylylidene))bis(2-hydroxybenzoic acid) via $^1$H NMR and $^{13}$C NMR. An example $^1$H NMR spectrum is shown in FIG. 1. An example $^{13}$C NMR spectrum is shown in FIG. 2.

Example 2: Mg Metal-Organic Framework Synthesis. 820 mL of a DMF/water solution (~0% to 20% water by weight) was preheated to 60° C. 5,5'-(((1E,2E)-ethane-1,2-diylidene)bis-(azaneylylidene))bis(2-hydroxybenzoic acid) (3.2 grams, Example 1) was added to the solvent and stirred for several minutes. Magnesium acetate tetrahydrate (3.3 grams) was then added to the reaction mixture, which was then stirred for a period of time (about 5 minutes to about 18 hours). A solid was obtained by filtration, which was then washed with a DMF/water solution (~0% to about 90% water by weight). The solid was then washed with ethanol and dried briefly on the filter paper. For storage, the solid may be stored as a crude solid as is or further dried at 120° C., particularly for characterization.

Figure 3:
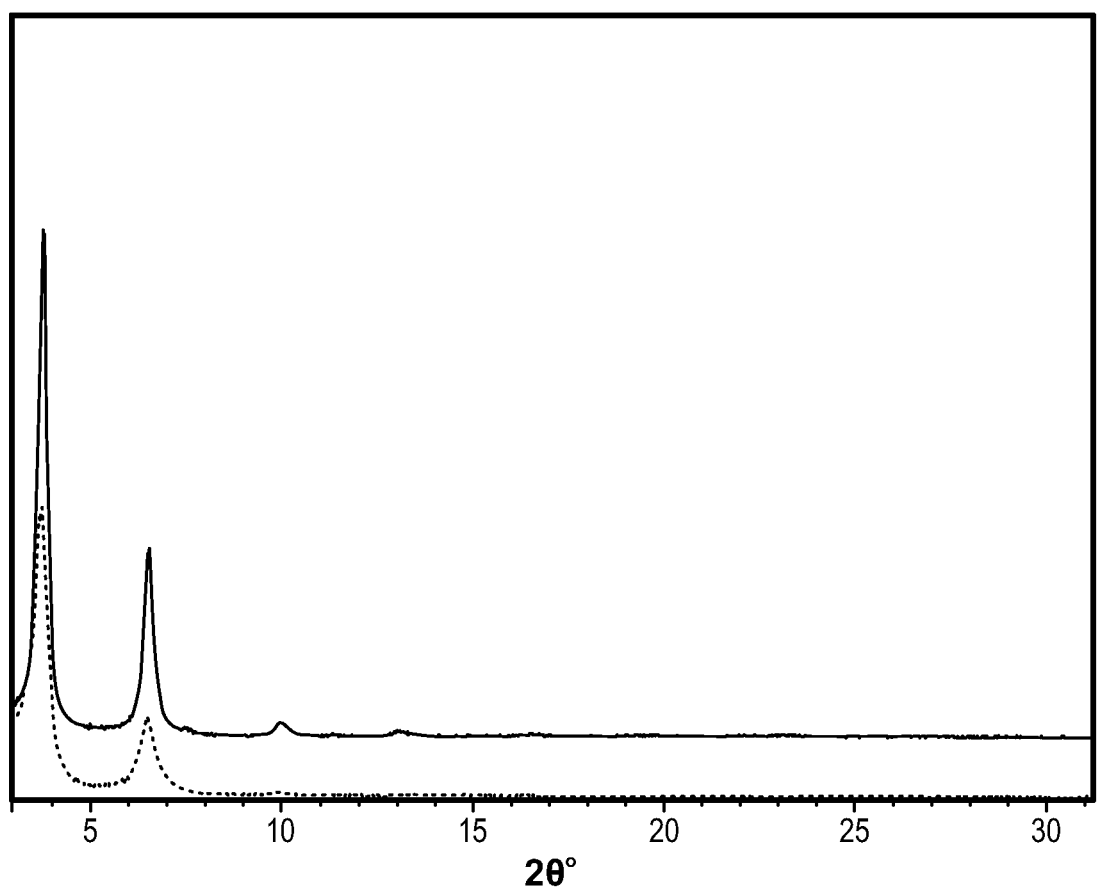
FIG. 3 shows illustrative powder X-ray diffraction patterns of magnesium 5,5'-(((1E,2E)-ethane-1,2-diylidene)bis-(azaneylylidene))bis(2-hydroxybenzoic acid) and zinc 5,5'-(((1E,2E)-ethane-1,2-diylidene)bis-(azaneylylidene))bis(2-hydroxybenzoic acid).
Figure 4:
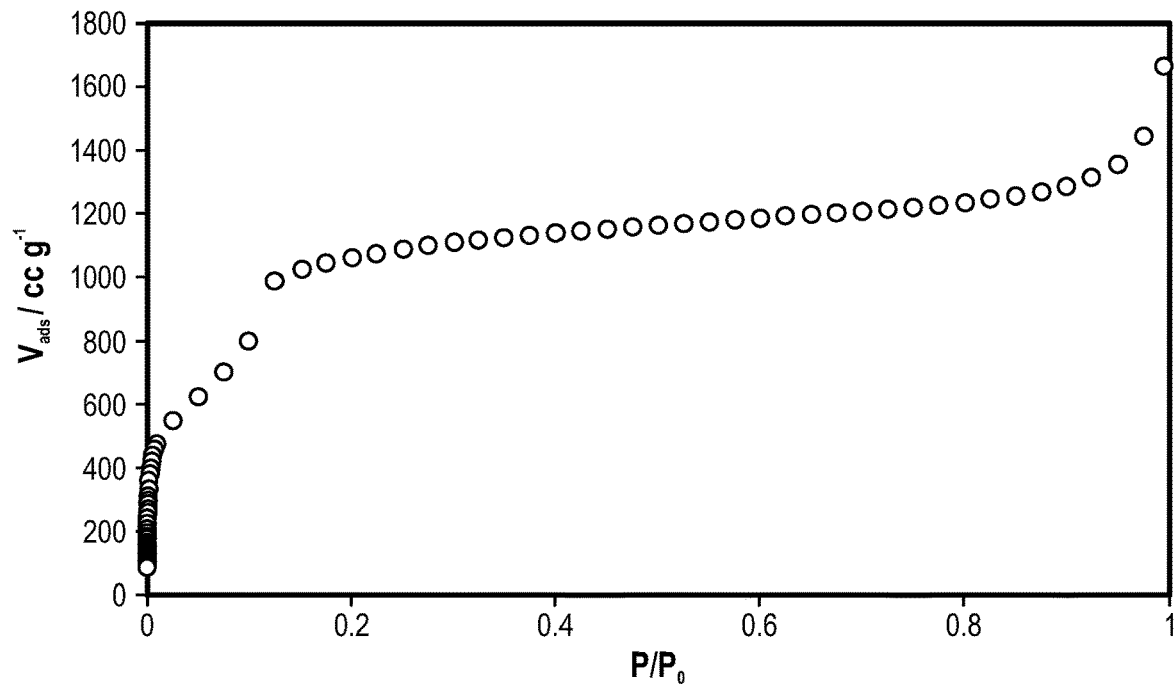
FIG. 4 shows an illustrative nitrogen gas adsorption isotherm at 77 K of magnesium 5,5'-(((1E,2E)-ethane-1,2-diylidene)bis-(azaneylylidene))bis(2-hydroxybenzoic acid).
Figure 5:
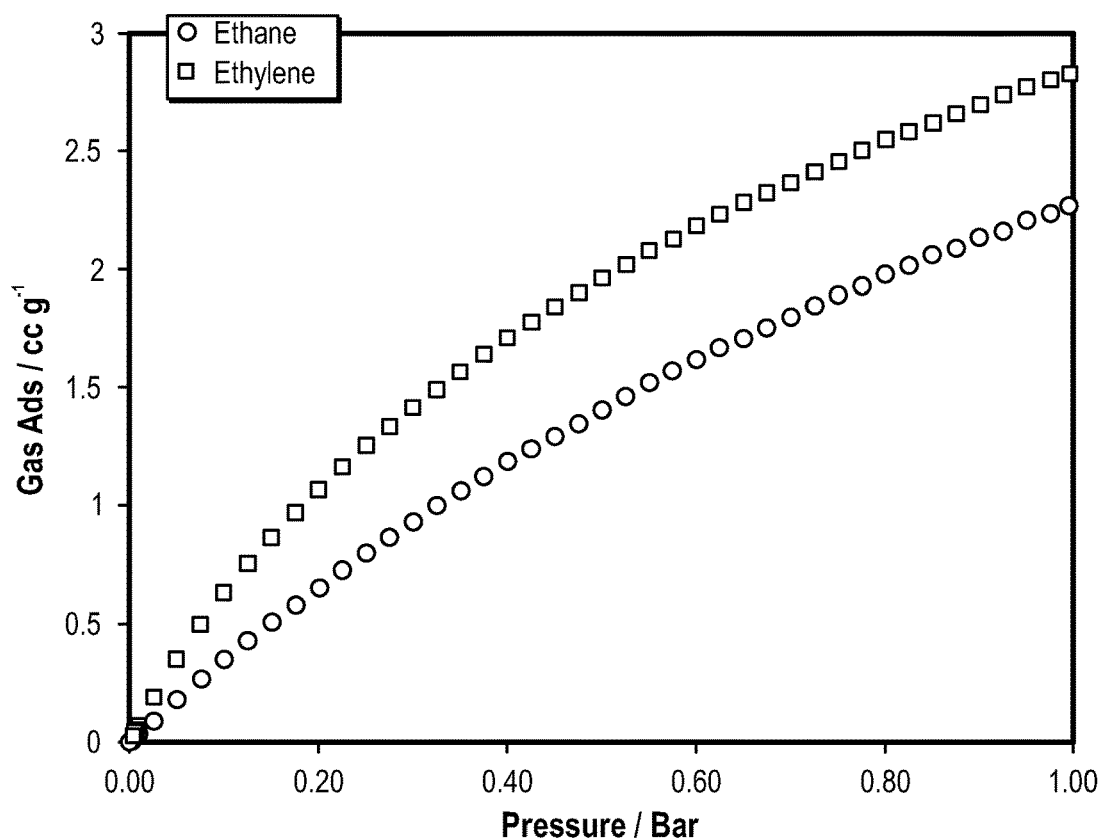
FIG. 5 shows illustrative ethane and ethylene adsorption isotherms of magnesium 5,5'-(((1E,2E)-ethane-1,2-diylidene)bis-(azaneylylidene))bis(2-hydroxybenzoic acid) at 30° C.

The product was characterized by X-ray powder diffraction and $N_2$ adsorption. An illustrative X-ray powder diffraction pattern for magnesium 5,5'-(((1E,2E)-ethane-1,2-diylidene)bis-(azaneylylidene))bis(2-hydroxybenzoic acid) is shown in the lower trace of FIG. 3. FIG. 4 shows an illustrative $N_2$ adsorption isotherm of magnesium 5,5'-(((1E,2E)-ethane-1,2-diylidene)bis-(azaneylylidene))bis(2-hydroxybenzoic acid) at 77 K. The $N_2$ adsorption isotherms were obtained after activation by heating. The corresponding surface area determined by analyzing the $P/P_0$ points below a value of 0.05 was 2593 $m^2/g$. FIG. 5 shows illustrative ethane and ethylene adsorption isotherms of magnesium 5,5'-(((1E,2E)-ethane-1,2-diylidene)bis-(azaneylylidene))bis(2-hydroxybenzoic acid) at 30° C., which show selective adsorption for ethylene.

Example 3: Zn Metal-Organic Framework Synthesis. 400 mL of a DMF/water solution (~0% to 40% water by weight) was preheated to 60° C. 5,5'-(((1E,2E)-ethane-1,2-diylidene)bis-(azaneylylidene))bis(2-hydroxybenzoic acid) (2 grams, Example 1) was added to the solvent and stirred for several minutes. Zinc acetate dihydrate (2.88 grams) was then added to the reaction mixture, which was then stirred for a period of time (about 5 minutes to about 18 hours). Optionally, the temperature of the reaction may be about 60° C. initially and then lowered as the reaction progresses. A solid was obtained by filtration, which was then washed with a DMF/water solution (0% to about 90% water by weight). The solid was then washed with ethanol and dried briefly on the filter paper. For storage, the solid may be stored as a crude solid as is or further dried at 120° C., particularly for characterization.

Figure 6:
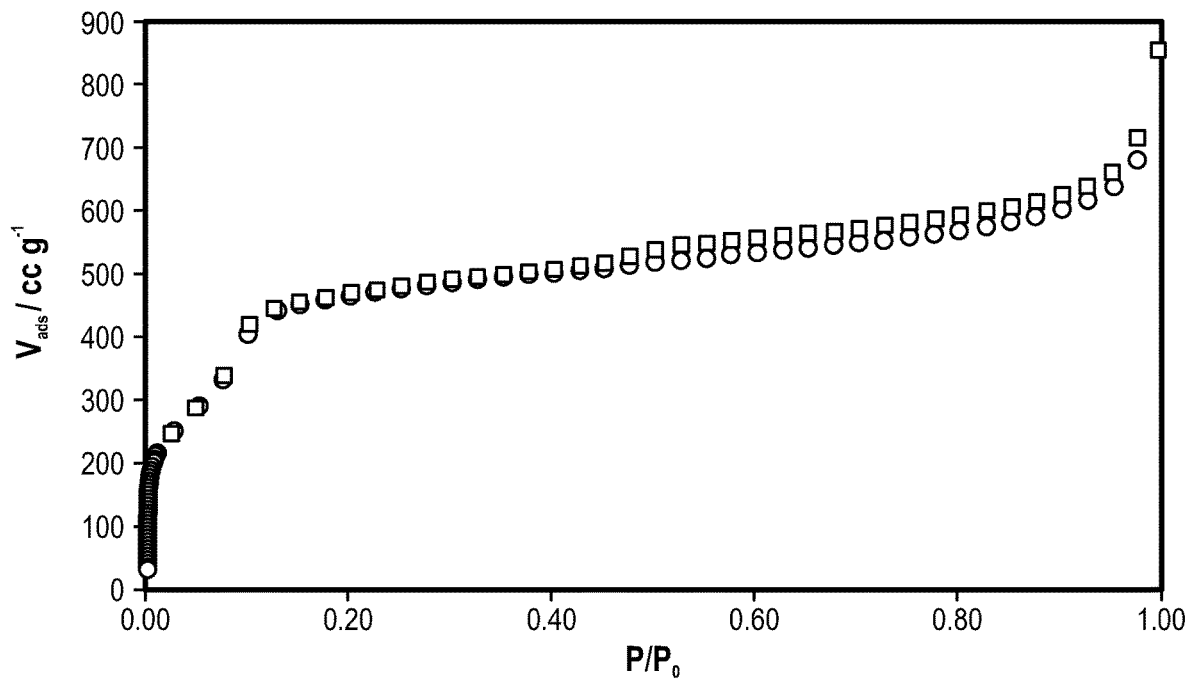
FIG. 6 shows an illustrative nitrogen gas adsorption isotherm at 77 K of zinc 5,5'-(((1E,2E)-ethane-1,2-diylidene)bis-(azaneylylidene))bis(2-hydroxybenzoic acid).

The product was characterized by X-ray powder diffraction and $N_2$ adsorption. An illustrative X-ray powder diffraction pattern of zinc 5,5'-(((1E,2E)-ethane-1,2-diylidene)bis-(azaneylylidene))bis(2-hydroxybenzoic acid) is shown in the upper trace of FIG. 3. As shown, the Mg and Zn metal-organic framework materials were isostructural with one another. FIG. 6 shows illustrative $N_2$ adsorption isotherms of zinc 5,5'-(((1E,2E)-ethane-1,2-diylidene)bis-(azaneylylidene))bis(2-hydroxybenzoic acid) at 77 K. The $N_2$ adsorption isotherms were obtained after activation at 150° C. The corresponding surface area determined from the isotherm was 960 $m^2/g$, and the total pore volume was 0.99 $cm^3/g$.

Example 4: Co Metal-Organic Framework Synthesis. 400 mL of a DMF/water solution (~0% to 40% water by weight) was preheated to 60° C. 5,5'-(((1E,2E)-ethane-1,2-diylidene)bis-(azaneylylidene))bis(2-hydroxybenzoic acid) (0.5 grams, Example 1) was added to the solvent, followed by anhydrous cobalt acetate (500 milligrams). The reaction mixture was stirred for a period of time (about 5 minutes to about 18 hours). Optionally, the temperature of the reaction may be about 60° C. initially and then lowered as the reaction progresses. A solid was obtained by filtration, which was then washed with a DMF/water solution (0% to about 90% water by weight). The solid was then washed with ethanol and dried briefly on the filter paper. For storage, the solid may be stored as a crude solid as is or further dried at 120° C., particularly for characterization.

Figure 7:
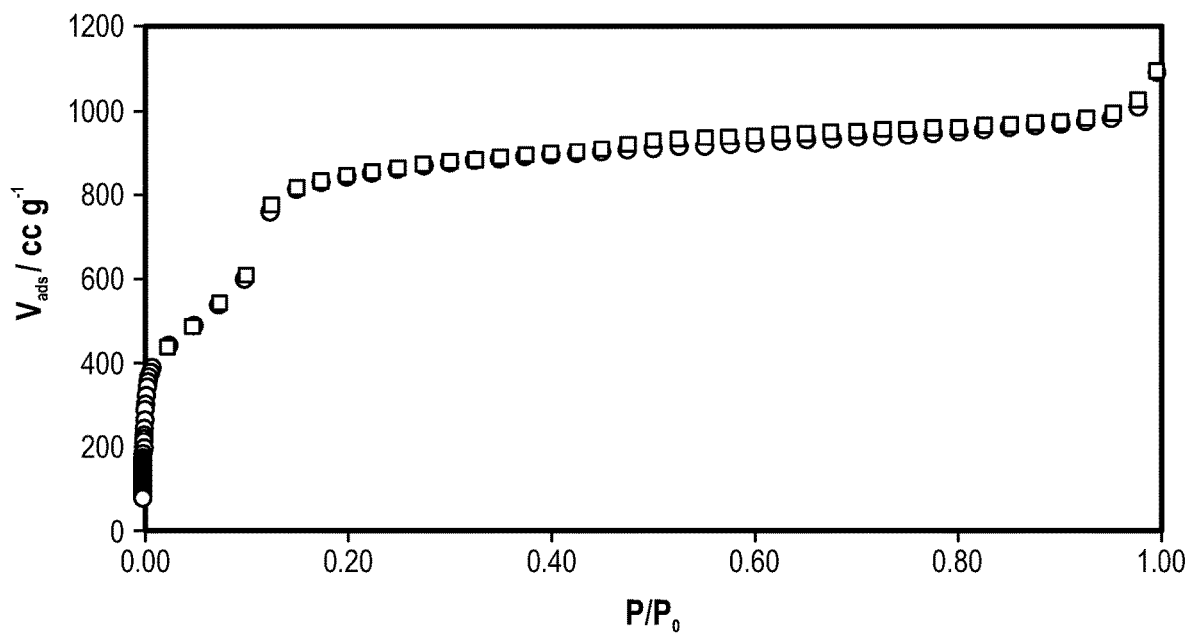
FIG. 7 shows an illustrative nitrogen gas adsorption isotherm at 77 K of cobalt 5,5'-(((1E,2E)-ethane-1,2-diylidene)bis-(azaneylylidene))bis(2-hydroxybenzoic acid).
Figure 8:
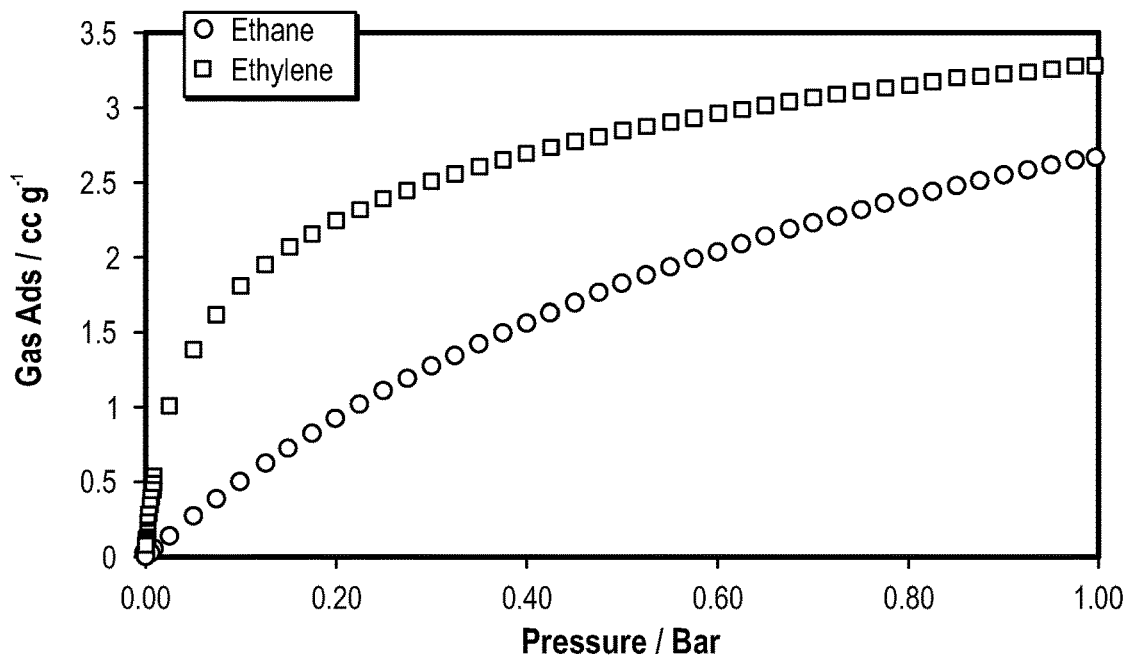
FIG. 8 shows illustrative ethane and ethylene adsorption isotherms of cobalt 5,5'-(((1E,2E)-ethane-1,2-diylidene)bis-(azaneylylidene))bis(2-hydroxybenzoic acid) at 30° C.

The product was characterized by $N_2$ adsorption. FIG. 7 shows illustrative $N_2$ adsorption isotherms of cobalt 5,5'-(((1E,2E)-ethane-1,2-diylidene)bis-(azaneylylidene))bis(2-hydroxybenzoic acid) at 77 K. As shown, the $N_2$ adsorption isotherm shapes were very similar for each of the Mg, Zn and Co metal-organic framework materials. FIG. 8 shows illustrative ethane and ethylene adsorption isotherms for cobalt 5,5'-(((1E,2E)-ethane-1,2-diylidene)bis-(azaneylylidene))bis(2-hydroxybenzoic acid) at 30° C., which show selective adsorption for ethylene.

Example 5: Ni Metal-Organic Framework Synthesis. 100 mL of a DMF/water solution (0% to 40% water by weight) was preheated to 60° C. 5,5'-(((1E,2E)-ethane-1,2-diylidene)bis-(azaneylylidene))bis(2-hydroxybenzoic acid) (0.5 grams, Example 1) was added to the solvent, followed by nickel acetate tetrahydrate (0.815 grams). The reaction mixture was stirred for a period of time (about 5 minutes to about 18 hours). A solid was obtained by filtration, which was then washed with a DMF/water solution (~0% to about 90% water by weight). The solid was then washed with ethanol and dried briefly on the filter paper. For storage, the solid may be stored as a crude solid as is or further dried at 120° C., particularly for characterization.

Example 6: Room Temperature Syntheses of Zn and Co Metal-Organic Frameworks. 56 mg of 5,5'-(((1E,2E)-ethane-1,2-diylidene)bis(azaneylylidene))bis(2-hydroxybenzoic acid) (Example 1) was combined with 15 mL DMF and 3.75 mL of water. 90 mg of zinc acetate dihydrate was added to the reaction mixture, which was then stirred overnight at ambient temperature. A solid was isolated by filtration, which was then washed with DMF and then ethanol. After washing, the solid was dried at 115° C. in an oven under air atmosphere. The corresponding cobalt metal-organic framework was synthesized similarly using 60 mg anhydrous cobalt acetate, 14 mL DMF and 6 mL water.

Figure 9:
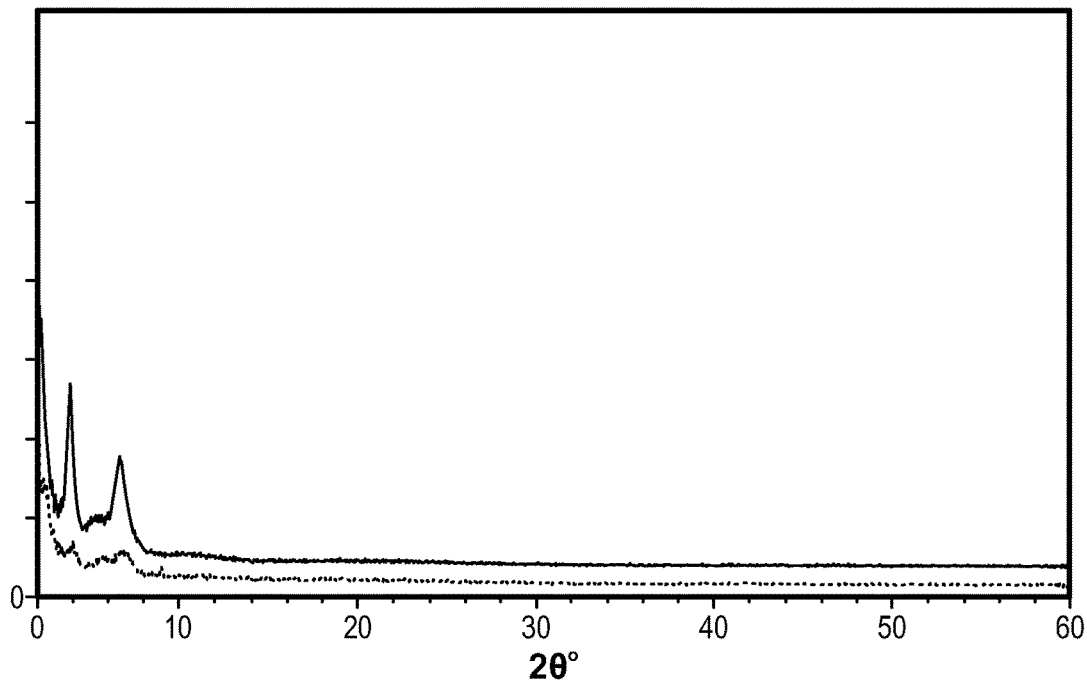
FIG. 9 shows illustrative powder X-ray diffraction patterns of cobalt 5,5'-(((1E,2E)-ethane-1,2-diylidene)bis-(azaneylylidene))bis(2-hydroxybenzoic acid) and zinc 5,5'-(((1E,2E)-ethane-1,2-diylidene)bis-(azaneylylidene))bis(2-hydroxybenzoic acid) formed at room temperature.

The products were characterized by X-ray powder diffraction. FIG. 9 shows X-ray powder diffraction patterns of zinc 5,5'-(((1E,2E)-ethane-1,2-diylidene)bis-(azaneylylidene))bis(2-hydroxybenzoic acid) (upper trace) and cobalt 5,5'-(((1E,2E)-ethane-1,2-diylidene)bis-(azaneylylidene))bis(2-hydroxybenzoic acid) (lower trace) formed at room temperature. As shown, the Co and Zn analogues were isostructural with one another. The differences between the X-ray powder diffraction pattern for the Zn analogue shown in FIG. 9 compared to that shown in FIG. 3 is believed to result from incomplete formation of the metal-organic framework network structure over the time the reaction was conducted at room temperature. The peak at a 2θ value of approximately 6.5° in the zinc analogue diffraction pattern is believed to result from formation of an amorphous phase, which may result from excessive moisture exposure. Similarly, the weak diffraction pattern for the cobalt analogue shown in FIG. 9 is believed to result from incomplete network structure formation.

Example 7: Metal Exchange of Mg Metal-Organic Framework. 2 grams of the crude solid from Example 2 (~200 mg dry solid) was suspended in 20 mL of DMF. 200 mg of anhydrous nickel bromide was dissolved in a separate portion of 20 mL DMF, with sonication being used to achieve full dissolution. The nickel solution was then added to the Mg metal-organic framework suspension, which immediately changed from yellow/orange to red in color upon addition of the nickel solution. The reaction mixture was stirred for about 6 hours and then filtered. The resulting solid was washed with DMF and then ethanol. For storage, the solid may be stored as a crude solid as is or dried at 150° C. under nitrogen atmosphere.

Figure 10:
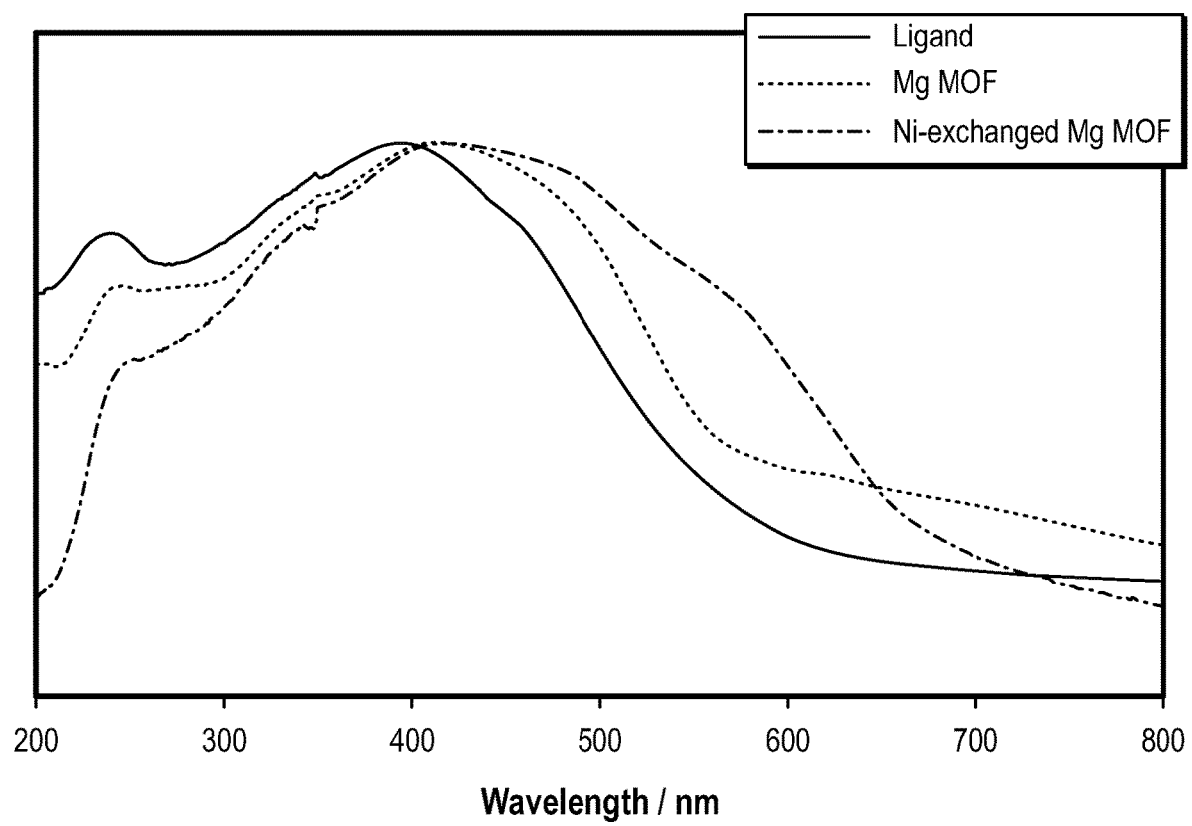
FIG. 10 shows illustrative UV-Vis spectra of 5,5'-(((1E,2E)-ethane-1,2-diylidene)bis(azaneylylidene))bis(2-hydroxybenzoic acid), magnesium 5,5'-(((1E,2E)-ethane-1,2-diylidene)bis(azaneylylidene))bis(2-hydroxybenzoic acid), and nickel-exchanged magnesium 5,5'-(((1E,2E)-ethane-1,2-diylidene)bis(azaneylylidene))bis(2-hydroxybenzoic acid).

UV-Vis spectra were collected for the ligand (Example 1), the corresponding Mg metal-organic framework (Example 2) and the nickel-exchanged Mg metal-organic framework (Example 7), as shown in FIG. 10. All samples were dispersed in gamma alumina as a diluent and compared against a background of pure gamma alumina. As shown, nickel exchange produced a change in the UV-Vis spectrum. The Mg metal-organic framework showed electronic transitions associated only with the ligand, whereas the nickel-exchanged metal-organic framework exhibited both bands associated with the ligand and the nickel.

All documents described herein are incorporated by reference herein for purposes of all jurisdictions where such practice is allowed, including any priority documents and/or testing procedures to the extent that they are not inconsistent with this text. As is apparent from the foregoing general description and the specific embodiments, while forms of the disclosure have been illustrated and described, various modifications may be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

The invention claimed is:

1. A metal-organic framework material comprising:
a plurality of metal centers, wherein the metal centers are selected from the group consisting of alkaline earth metals, zinc, cobalt, nickel, copper, manganese, chromium, iron, and combinations thereof; and
a multidentate organic ligand coordinated via at least two binding sites to the plurality of metal centers to define an at least partially crystalline network structure having a plurality of internal pores;
wherein the multidentate organic ligand comprises a reaction product of a vicinal dicarbonyl compound and an amine-substituted salicylic acid, the multidentate organic ligand comprising a first binding site and a second binding site that are bridged together with a third binding site, the first and second binding sites each comprising a salicylate moiety and the third binding site comprising a diimine moiety.

2. The metal-organic framework material of claim 1, wherein the amine-substituted salicylic acid is 5-aminosalicylic acid.

3. The metal-organic framework material of claim 1, wherein the vicinal dicarbonyl compound is glyoxal.

4. The metal-organic framework material of claim 1, wherein the multi dentate organic ligand is 5,5'-(((1E,2E)-ethane-1,2-diylidene)bis-(azaneylylidene))bis(2-hydroxybenzoic acid).

5. The metal-organic framework material of claim 1, wherein at least a portion of the plurality of metal centers comprise a divalent metal.

6. The metal-organic framework material of claim 1, wherein the first binding site is coordinated to a first divalent metal center and the second binding site is coordinated to a second divalent metal center, the first divalent metal center and the second divalent metal center comprising the same divalent metal.

7. The metal-organic framework material of claim 5, wherein the divalent metal is an alkaline earth metal.

8. The metal-organic framework material of claim 5, wherein the divalent metal is magnesium.

9. The metal-organic framework material of claim 1, wherein at least the first binding site and the second binding site are coordinated to a metal center to define the at least partially crystalline network structure.

10. The metal-organic framework material of claim 1, wherein the first binding site and the second binding site are coordinated to at least one type of metal center and the third binding site is coordinated to a second type of metal center.

11. The metal-organic framework material of claim 10, wherein the at least one type of metal center comprises a divalent metal.

12. The metal-organic framework material of claim 11, wherein the second type of metal center comprises a divalent metal differing from the at least one type of metal center coordinated to the first binding site and the second binding site.

13. The metal-organic framework material of claim 1, wherein the first binding site is coordinated to a first type of metal center and the second binding site is coordinated to a second type of metal center, the first type of metal center and the second type of metal center being the same.

14. The metal-organic framework material of claim 1, wherein the first binding site is coordinated to a first type of metal center and the second binding site is coordinated to a second type of metal center, the first type of metal center and the second type of metal center being different.

15. The metal-organic framework material of claim 13, wherein the metal-organic framework material lacks a metal center at the third binding site or is incompletely occupied with a metal center at the third binding site.

16. The metal-organic framework material of claim 13, wherein the metal-organic framework material comprises a metal center at the third binding site.

17. The metal-organic framework material of claim 13, wherein the first type of metal center and the second type of metal center comprise a divalent metal.

18. The metal-organic framework material of claim 1, wherein the first binding site, the second binding site, and the third binding site are coordinated to the same type of metal center.

19. The metal-organic framework material of claim 1, wherein the metal-organic framework material lacks a metal center at the third binding site or is incompletely occupied with a metal center at the third binding site.

20. The metal-organic framework material of claim 1, wherein at least a portion of the plurality of metal centers comprises magnesium, manganese, chromium, iron, copper, cobalt, nickel, or any combination thereof.

21. A method comprising:
combining a metal source, wherein the metal source is selected from the group consisting of divalent metal of an alkaline earth metal, zinc, cobalt, nickel, copper, manganese, chromium, iron, and combinations thereof, with a multidentate organic ligand comprising a reaction product of a vicinal dicarbonyl compound and an amine-substituted salicylic acid, the multidentate organic ligand comprising a first binding site and a second binding site that are bridged together with a third binding site, the first and second binding sites each comprising a salicylate moiety and the third binding site comprising a diimine moiety; and
reacting the metal source with the multidentate organic ligand under conditions effective to form a metal-organic framework material having an at least partially crystalline network structure with a plurality of internal pores defined therein and comprising a plurality of metal centers, a metal center being coordinated to at least the first binding site and the second binding site, the metal centers coordinated to the first binding site and the second binding site each comprising a first metal, or the metal center coordinated to the first binding site comprising the first metal and the metal center coordinated to the second binding site comprising a second metal.

22. The method of claim 21, wherein the multidentate organic ligand is 5,5'-(((1E,2E)-ethane-1,2-diylidene)bis(azaneylylidene))bis(2-hydroxybenzoic acid).

23. The method of claim 21, wherein at least a portion of the plurality of metal centers comprise a divalent metal.

24. The method of claim 21, wherein the first binding site is coordinated to a first divalent metal center and the second binding site is coordinated to a second divalent metal center, the first divalent metal center and the second divalent metal center comprising the same divalent metal.

25. The method of claim 1, wherein the first binding site is coordinated to a first divalent metal center and the second binding site is coordinated to a second divalent metal center, the first divalent metal center and the second divalent metal center comprising different divalent metals.

26. The method of claim 23, wherein the divalent metal is an alkaline earth metal.

27. The method of claim 23, wherein the divalent metal is magnesium.

28. The method of claim 21, wherein the metal-organic framework material lacks a metal center at the third binding site or is incompletely occupied with a metal center at the third binding site.

29. The method of claim 21, further comprising:
introducing a metal center to the at least partially crystalline network structure at the third binding site, the metal center at the third binding site differing from the first metal coordinated at the first binding site and the second binding site, or the metal center at the third binding site differing from the first metal coordinated at the first binding site and the second metal coordinated at the second binding site.

30. The method of claim 29, wherein introducing the metal center to the at least partially crystalline network structure at the third binding site comprises exchanging first metal or second metal coordinated at the third binding site for a different metal.

31. The method of claim 29, wherein introducing the metal center to the at least partially crystalline network structure at the third binding site comprises filling an empty third binding site with a different metal.

32. The method of claim 21, wherein the metal source comprises one or more of manganese, chromium, iron, copper, cobalt, nickel, palladium, platinum, gold, silver, iridium, osmium, ruthenium, and rhodium.

33. A method comprising:
providing a metal-organic framework material comprising a plurality of metal centers, wherein the metal centers are selected from the group consisting of alkaline earth metals, zinc, cobalt, nickel, copper, manganese, chromium, iron, and combinations thereof, coordinated via at least two binding sites to 5,5'-(((1E,2E)-ethane-1,2-diylidene)bis(azaneylylidene))-bis(2-hydroxybenzoic acid) to define an at least partially crystalline network structure having a plurality of internal pores, at least a portion of the plurality of metal centers comprising a divalent metal;
contacting the metal-organic framework material with a fluid comprising carbon dioxide; and
sequestering at least a portion of the carbon dioxide from the fluid into the metal-organic framework material.

34. The method of claim 33, wherein the divalent metal is one or more of magnesium, manganese, chromium, iron, copper, cobalt, and nickel.

35. A method comprising:
providing a metal-organic framework material comprising a plurality of metal centers, wherein the metal centers are selected from the group consisting of alkaline earth metals, zinc, cobalt, nickel, copper, manganese, chromium, iron, and combinations thereof, coordinated via at least two binding sites to 5,5'-(((1E,2E)-ethane-1,2-diylidene)bis(azaneylylidene))-bis(2-hydroxybenzoic acid) to define an at least partially crystalline network structure having a plurality of internal pores, at least a portion of the plurality of metal centers comprising a divalent metal;
contacting the metal-organic framework material with a fluid comprising one or more hydrocarbons; and
sequestering at least a portion of the one or more hydrocarbons from the fluid into the metal-organic framework material.

36. The method of claim 35, wherein the divalent metal is one or more of magnesium, manganese, chromium, iron, copper, cobalt, and nickel.

37. The method of claim 35, wherein the one or more hydrocarbons comprise two or more different hydrocarbons, and a first hydrocarbon is preferentially sequestered into the metal-organic framework material over a second hydrocarbon.

* * * * *